United States Patent
Doutre et al.

(10) Patent No.: US 11,600,010 B2
(45) Date of Patent: Mar. 7, 2023

(54) TIME-OF-FLIGHT CAMERA HAVING IMPROVED DYNAMIC RANGE AND METHOD OF GENERATING A DEPTH MAP

(71) Applicant: Lucid Vision Labs, Inc., Richmond (CA)

(72) Inventors: Colin R. Doutre, Vancouver (CA); Zicong Mai, Burnaby (CA); Jeffrey D. Bull, New Westminster (CA); Roderick A. Barman, Vancouver (CA)

(73) Assignee: Lucid Vision Labs, Inc., Richmond (CA)

( * ) Notice: Subject to any disclaimer, the term of this patent is extended or adjusted under 35 U.S.C. 154(b) by 110 days.

(21) Appl. No.: 16/891,567

(22) Filed: Jun. 3, 2020

(65) Prior Publication Data

US 2021/0383559 A1    Dec. 9, 2021

(51) Int. Cl.
    *G06K 9/00*    (2022.01)
    *G06T 7/50*    (2017.01)
    (Continued)

(52) U.S. Cl.
    CPC .............. *G06T 7/50* (2017.01); *H04N 5/20* (2013.01); *H04N 5/30* (2013.01); *G06T 2207/10028* (2013.01)

(58) Field of Classification Search
    CPC ... G06T 7/50; G06T 2207/10028; H04N 5/20; H04N 5/30
    See application file for complete search history.

(56) References Cited

U.S. PATENT DOCUMENTS

| 9,134,114 B2 * | 9/2015 | Metz ................. G01S 7/4808 |
| 2014/0037135 A1 * | 2/2014 | Kutliroff ............. H04N 5/2354 348/46 |

(Continued)

FOREIGN PATENT DOCUMENTS

CN    109765565 A  *  5/2019  ............. G01S 17/89

OTHER PUBLICATIONS

Vision and ToF-based driving assistance for a personal transpoter, Thomas Schamm et al., IEEE, 2009, pp. 1-17 (Year: 2009).*

(Continued)

*Primary Examiner* — Jayesh A Patel
(74) *Attorney, Agent, or Firm* — Nexus Law Group LLP; Nicholas P. Toth

(57) ABSTRACT

A time-of-flight camera for generating a depth map indicating distance(s) to target(s) includes a processor and multi-pixel time-of-flight image sensor. The camera: (a) determines, at each pixel, a plurality of phase-correlation values associated with at least one exposure duration and at least one phase offset; (b) determines for each pixel an accumulated correlation in response to the plurality of phase-correlation values; and (c) generates the depth map in response to a plurality of the accumulated correlations. A set of accumulated correlations may be determined in response to a plurality of sets of phase-correlation values such that each accumulated correlation is associated with one unique phase offset in response to each set of phase-correlation values being associated with one exposure duration, the depth map being generated in response to a plurality of sets of accumulated correlations. A computer-implemented method of generating a depth map using a time-of-flight image sensor is provided.

21 Claims, 7 Drawing Sheets

(51) Int. Cl.
    *H04N 5/30*    (2006.01)
    *H04N 5/20*    (2006.01)

(56) References Cited

U.S. PATENT DOCUMENTS

2017/0270644 A1*  9/2017  Zhao ......................... G06T 7/50
2020/0314294 A1*  10/2020  Schoenlieb .......... H04N 5/2226

OTHER PUBLICATIONS

Digital Image Stabilization with Sub-Image Phase Correlation Based Global Motion Estimation, S. Erturk et al., IEEE, 2003, pp. 1320-1325 (Year: 2003).*
Video-Rate Stereo Depth Measurement on Programmable Hardware, Ahmad Darabiha et al., IEEE, 2003, pp. 1-8 (Year: 2003).*
A Real-Time Large Disparity Range Stereo-System using FPGAs, Divyang K Masrani et al., IEEE, 2006, pp. 1-8 (Year: 2006).*
J. Hahne and M. Alexa, "Exposure Fusion for Time-Of-Flight Imaging", Pacific Graphics 2011, Computer Graphics Forum, vol. 30 (2011), No. 7, The Eurographics Association and Blackwell Publishing Ltd.
J. Hartung, G. Knapp, and B. Sinha, Statistical Meta-Analysis with Applications, 2008, John Wiley & Sons, Inc.
European Machine Vision Association, EMVA Standard 1288: Standard for Characterization of Image Sensors and Cameras, Release 3.1, Dec. 30, 2016, EMVA.

* cited by examiner

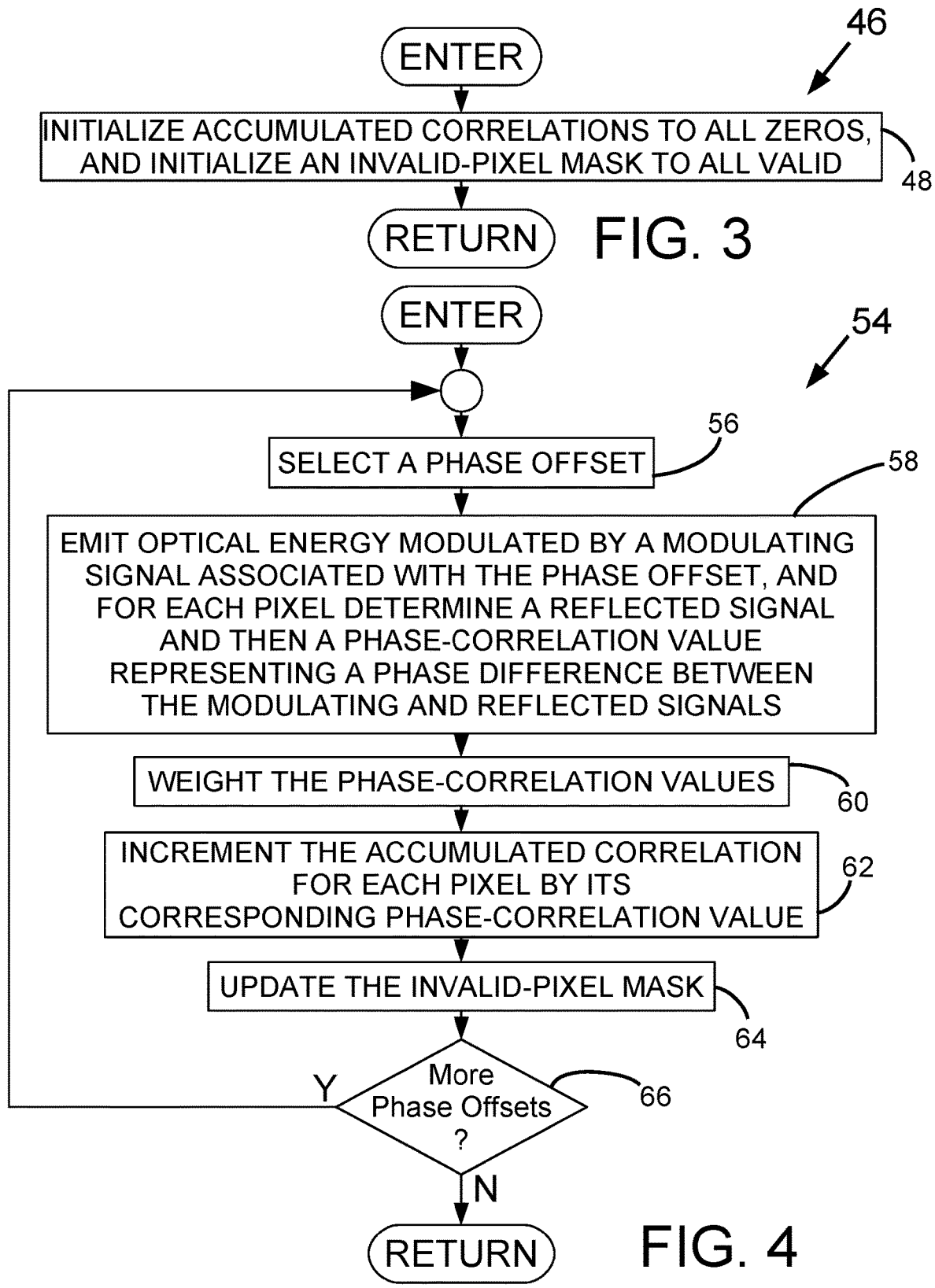

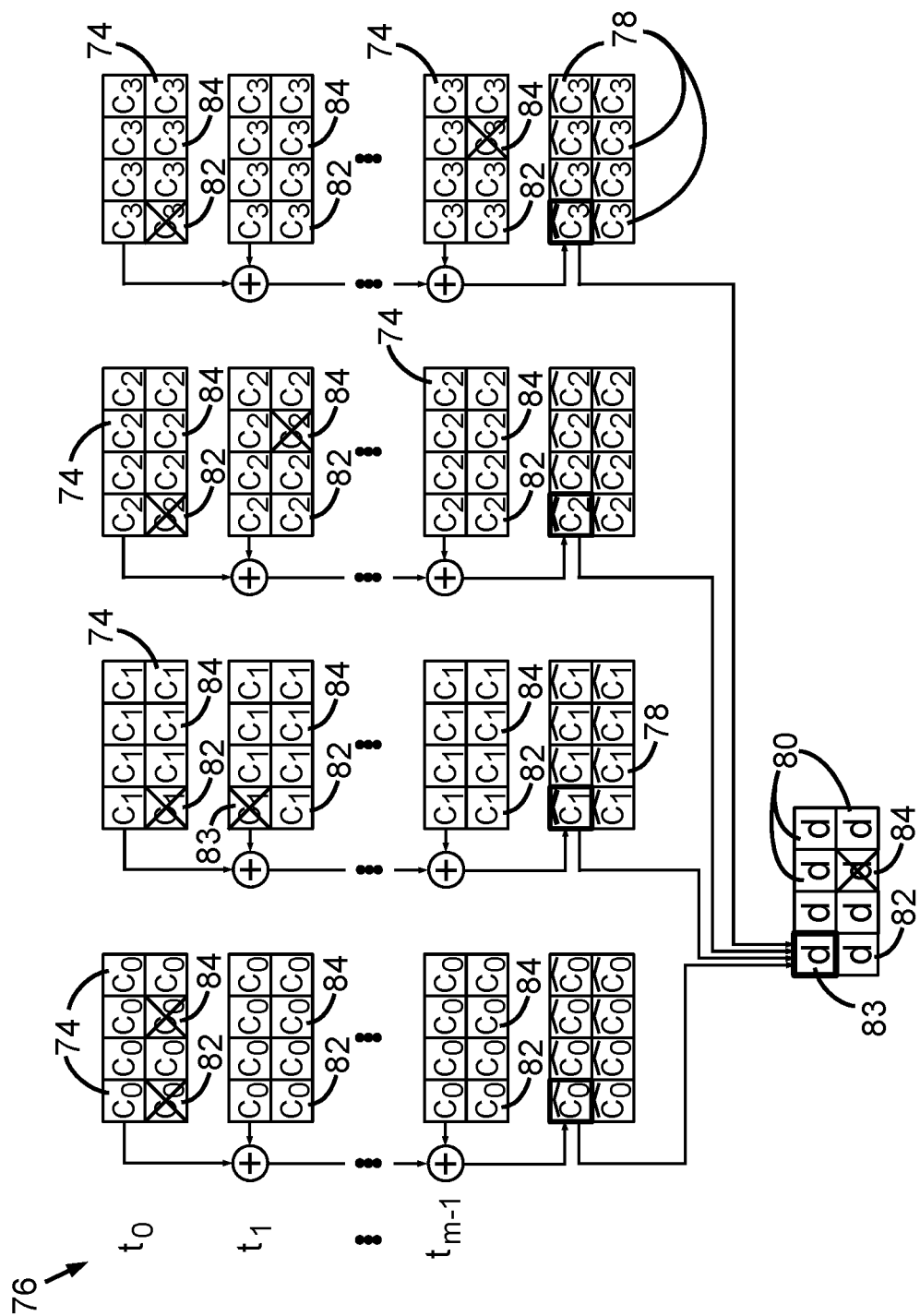

US 11,600,010 B2

TIME-OF-FLIGHT CAMERA HAVING IMPROVED DYNAMIC RANGE AND METHOD OF GENERATING A DEPTH MAP

BACKGROUND OF THE INVENTION

1. Field of Invention

This invention relates to time-of-flight cameras for generating depth maps and, in particular, to a time-of-flight camera having improved dynamic range and a method of generating a depth map exhibiting improved dynamic range.

2. Description of Related Art

Time-of-flight cameras typically modulate an optical carrier wave with a modulating signal and then emit the modulated optical wave toward a target for an exposure duration of time. After reflecting from the target, the modulated optical wave is sensed by an image sensor of the camera and demodulated to produce a reflected signal that is comparable to the modulating signal, but phase shifted in proportion to the distance between the target and the sensor. By synchronizing the emitting and sensing, and by measuring the phase difference between the modulating and reflected signals, the time-of-flight camera determines a depth map representing the distance to typically multiple targets. Many time-of-flight cameras are also capable of displaying an amplitude image of the light intensity of the scene being captured by the sensor.

The exposure duration is typically user selectable. Selecting an exposure duration that is too short results in poor noise performance that degrades the quality of the depth map and amplitude image. Selecting an exposure duration that is too long can oversaturate pixels of the image sensor, resulting in invalid depth data. The range of viable exposure durations is limited by the dynamic range of the time-of-flight camera. Thus, the exposure duration is typically selected as a compromise between near (bright) and far (dim) portions of a given scene.

The journal article to U. HAHNE and M. ALEXA, "Exposure Fusion for Time-Of-Flight Imaging", Pacific Graphics 2011, Computer Graphics Forum, Volume 30 (2011), Number 7, The Eurographics Association and Blackwell Publishing Ltd., describes capturing time-of-flight image data and generating depth maps multiple times using different exposure durations, searching locally in each generated depth map for regions which provide most accurate depth-map data, and fusing the depth-map data of different regions associated with different exposure durations to produce a single depth map that can be of higher quality than any one of the originally generated depth maps. The process of Hahne and Alexa, however, involves taking steps to improve quality only after generating the depth-maps when it is no longer possible to minimize the effect of certain distortions in the captured image data.

An object of the invention is to address the above shortcomings.

SUMMARY

The above shortcomings may be addressed by providing, in accordance with one aspect of the invention, a computer-implemented method of generating a depth map using a time-of-flight image sensor having a plurality of pixels, the method involves: (a) at each of the pixels, determining a plurality of phase-correlation values associated with at least one exposure duration and at least one phase offset; (b) for each of the pixels, determining by a computer processor an accumulated correlation in response to the plurality of phase-correlation values; and (c) generating the depth map in response to a plurality of the accumulated correlations associated with the plurality of pixels.

Step (a) may involve selecting one of the exposure durations, selecting one of the phase offsets, for each of the pixels determining a reflected signal in response to reflected energy sensed by the time-of-flight image sensor, and for each of the pixels determining one such phase-correlation value representing a phase difference between a modulating signal associated with the one phase offset and the reflected signal during a time period associated with the one exposure duration. Step (a) may involve weighting each of the phase-correlation values according to a weighting function associated with the at least one exposure duration. Step (b) may involve determining the accumulated correlation as a sum of valid ones of the phase-correlation values. The method may involve determining, in response to the plurality of phase-correlation values, an invalid-pixel mask associated with the plurality of pixels. Step (c) may involve generating the depth map in response to the plurality of accumulated correlations and the invalid-pixel mask. The method may involve determining, in response to the plurality of phase-correlation values and the at least one exposure duration, a normalization mask associated with the plurality of pixels. The method may further involve: (d) generating an amplitude image in response to the plurality of accumulated correlations associated with the plurality of pixels and the normalization mask. Step (b) may involve determining, for each of the pixels, a plural set of the accumulated correlations in response to a plurality of sets of the phase-correlation values such that each such accumulated correlation is associated with one unique phase offset in response to each of the sets of phase-correlation values being associated with the one exposure duration. Step (c) may involve generating the depth map in response to a plurality of the sets of accumulated correlations. Step (b) may involve incrementing each of the accumulated correlations by a corresponding the phase-correlation value if the corresponding phase-correlation value is a member of a valid set of the sets of phase-correlation values. Step (a) may involve weighting each of the phase-correlation values according to a weighting function associated with the at least one exposure duration. Step (b) may involve determining the plural set such that each of the sets of phase-correlation values is associated with one unique exposure duration. The method may involve determining, in response to the plurality of sets of accumulated correlations, an invalid-pixel mask indicating as invalid any one of the pixels for which each and every set of the sets of phase-correlation values associated with the any one pixel contains one or more invalid phase-correlation values. Step (c) may involve generating the depth map in response to the plurality of sets of accumulated correlations and in response to the invalid-pixel mask. The method may involve determining a normalization mask indicating for each of the pixels a sum associated with all valid exposure durations associated with a valid set of the sets of phase-correlation values for which all the phase-correlation values of the valid set are valid. The method may further involve generating an amplitude image in response to the plurality of sets of accumulated correlations and the normalization mask. Step (b) may involve, in response to an invalid set of phase-correlation values appearing among the plurality of sets of phase-correlation values, linearly extrapolating the set of accumulated correlations on the basis of one or more valid sets of phase-correlation values selected from among the plurality of sets of phase-correlation values.

In accordance with another aspect of the invention, there is provided a time-of-flight camera operable to generate a depth map, the camera including a time-of-flight image sensor having a plurality of pixels, the camera including a processor, the camera being configured to: (a) determine, at each of the pixels, a plurality of phase-correlation values associated with at least one exposure duration and at least one phase offset; (b) determine by the processor, for each of the pixels, an accumulated correlation in response to the plurality of phase-correlation values; and (c) generate the depth map in response to a plurality of the accumulated correlations associated with the plurality of pixels.

The processor may be configured to determine, for each of the pixels, a plural set of the accumulated correlations in response to a plurality of sets of the phase-correlation values such that each of the accumulated correlations is associated with one unique phase offset in response to each set of the sets of phase-correlation values being associated with one exposure duration, and configured to generate the depth map in response to a plurality of the sets of accumulated correlations. The processor may be configured to increment each such accumulated correlation by a corresponding one of the phase-correlation values if the corresponding phase-correlation value is a member of a valid set of phase-correlation values.

In accordance with another aspect of the invention, there is provided a time-of-flight camera that includes: (a) means for determining a plurality of phase-correlation values; (b) means for determining an accumulated correlation in response to the plurality of phase-correlation values; and (c) means for generating a depth map in response to a plurality of the accumulated correlations.

The means for determining the accumulated correlation in response to the plurality of phase-correlation values may include means for incrementing the accumulated correlation. The camera may further include means for generating an amplitude image in response to the plurality of accumulated correlations.

The foregoing summary is illustrative only and is not intended to be in any way limiting. Other aspects and features of the present invention will become apparent to those of ordinary skill in the art upon review of the following description of embodiments of the invention in conjunction with the accompanying figures and claims.

BRIEF DESCRIPTION OF THE DRAWINGS

In drawings which illustrate by way of example only embodiments of the invention:

FIG. 3 is a flow diagram of an exemplary method for performing a first method step of FIG. 2, showing initializations according to a first embodiment of the invention;

FIG. 4 is a flow diagram of an exemplary method for performing second and third method steps of FIG. 2, showing a step of determining phase-correlation values and a step of determining an accumulation correlation according to the first embodiment;

FIG. 9 is a block diagram of a time sequence of operations of the time-of-flight image sensor of the camera of FIG. 1, showing the depth map being invalid at one pixel position according to the second embodiment.

DETAILED DESCRIPTION

A time-of-flight camera includes: (a) means for determining a plurality of phase-correlation values; (b) means for determining an accumulated correlation in response to the plurality of phase-correlation values; and (c) means for generating a depth map in response to a plurality of the accumulated correlations. The means for determining the accumulated correlation in response to the plurality of phase-correlation values may include means for incrementing the accumulated correlation. The camera may further include means for generating an amplitude image in response to the plurality of accumulated correlations.

Figure 1:
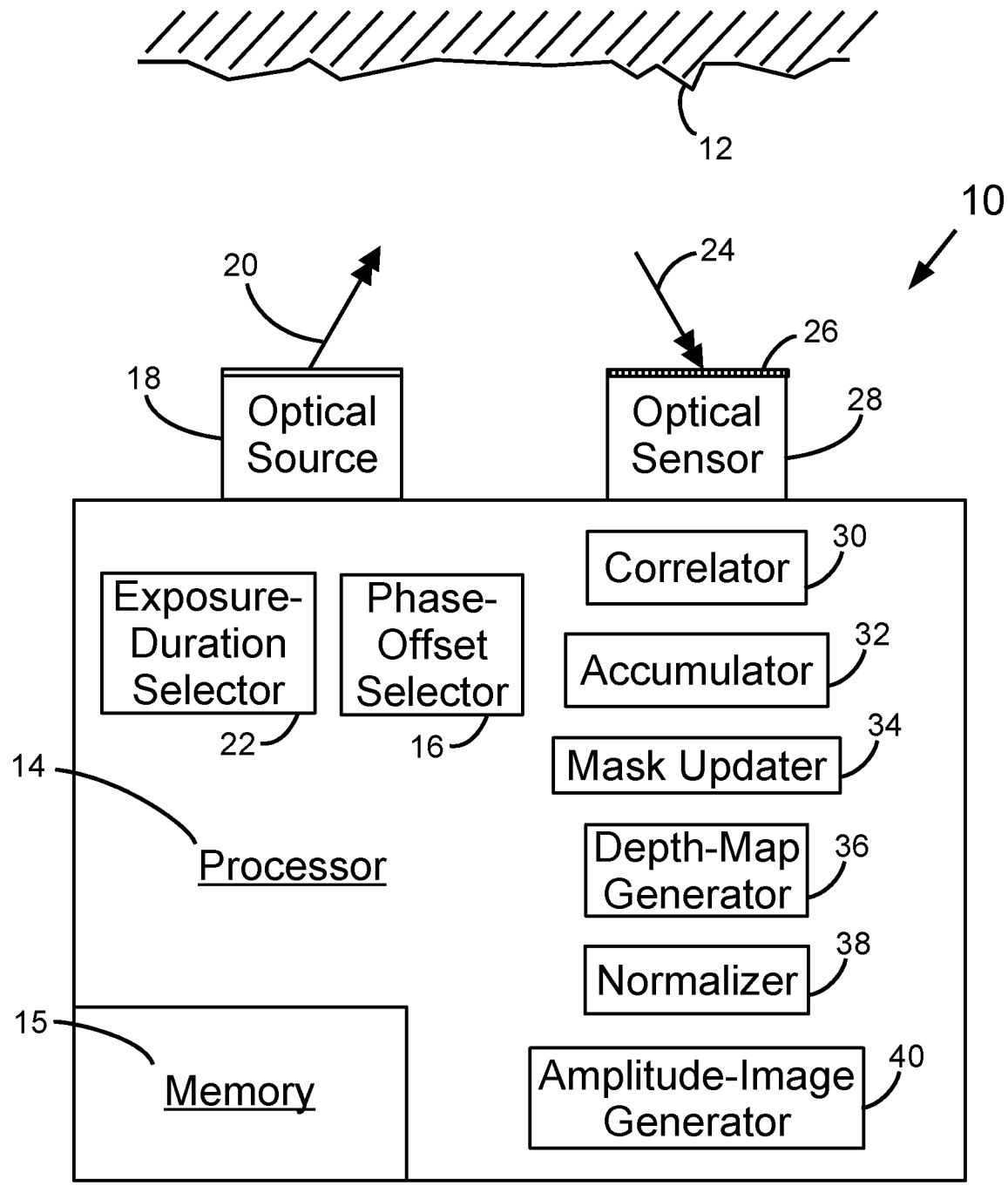
FIG. 1 is a block diagram of a time-of-flight camera according to embodiments of the invention.

Referring to FIG. 1, the camera according to embodiments of the invention is shown generally at 10. The camera 10 is a time-of-flight camera 10 operable to generate a depth map indicating distance(s) between the camera 10 and object(s) 12 within the field of view of the camera 10. The camera 10 is also operable to determine an amplitude image as a grey-scale representation of the scene within the field of view of the camera 10. Such representation is typically suitable for human viewing when displayed on a digital display.

The camera 10 includes a processing circuit, such as the processor 14 shown in FIG. 1, for controlling operations of the camera 10 according to embodiments of the invention.

The camera 10 is operable to modulate an optical carrier wave with a modulating signal having a relative phase, or phase offset, selected by the phase-offset selector 16. The optical carrier wave may be an infra-red lightwave, for example. The modulating signal may be a radio-frequency (RF) sinusoidal signal, a RF square-wave signal, other periodic signal or combination of periodic signals, or other known signal for example. The optical source 18 emits the modulated optical wave as modulated optical energy 20 directed toward the objects 12 for a time period, or number of periodic cycles of the modulating signal, associated with an exposure duration selected by the exposure-duration selector 22.

The objects 12 are typically non-transparent and are assumed to reflect optical energy that can be sensed by the camera 10 as the reflected optical energy 24 impinging on image-sensing pixels 26 of a time-of-flight image sensor such as the optical sensor 28 shown in FIG. 1. The sensor 28, or in some embodiments other component(s) of the camera 10, is operable to demodulate the reflected optical energy 24 to produce, for each pixel 26 of the sensor 28, a reflected signal that is comparable to the modulating signal over a time period, or number of periodic cycles of the reflected signal, associated with the previously selected exposure duration. However, the phase of the reflected optical signal corresponding to a given pixel 26 will be different from that of the modulating signal according to the distance travelled by the combined paths of the modulated optical energy 20 and the reflected optical energy 24. By synchronizing the operations of the optical source 18 and the optical sensor 28 and measuring the phase difference between the modulating and reflected signals corresponding to each pixel 26, the camera 10 is operable to determine the depth map of the scene within the field of view of the camera 10.

In some embodiments, the sensor 28 includes two charge storage nodes for each pixel 26, and during exposure to the reflected energy switches between each half-pixel (not shown) at a rate corresponding to the frequency of the modulating signal. However, in general, any suitable time-of-flight sensor 28 may be employed.

The camera 10 includes a correlator 30 for determining, for each pixel 26, the mathematical correlation between the modulating and reflected signals during the exposure duration as a phase-difference correlation, and digitally encoding the phase-correlation values to produce a phase-correlation image. In some embodiments, the correlator 30 function of producing the digitized phase-correlation values is integral to the sensor 28. In some embodiments, the correlator 30 performs additional processing, such as applying mathematical weights or other mathematical functions to the phase-correlation values produced by or within the sensor 28.

The camera 10 is operable to iterate the process of selecting a phase offset, modulating an optical carrier according to the phase offset, emitting the modulated optical energy 20, sensing at each pixel 26 the reflected optical energy 24, and determining phase-correlation values associated with the pixels 26. In variations of embodiments, this process may be iterated using the same or different exposure durations. Iterations of different phase offsets and different exposure durations may occur in any order.

With each new iteration or after multiple iterations, the accumulator 32 determines for each pixel 26 an accumulated correlation representing a sum of phase-correlation values.

It is possible for a given phase-correlation value to be invalid. For example, the optical sensor 28 has a specifiable dynamic range such that a given pixel 26 will become saturated by excessive reflected optical energy 24. Also, the given pixel 26 may be inoperable or otherwise malfunctioning, the digital encoding of the pixel 26 output may be overloaded, or other computational errors may occur. A given phase-correlation value is considered invalid whenever its digital value is outside of a specifiable range. For example, in an 8-bit system, the digital value 11111111 is considered invalid as the true value is equal to or greater than the maximum value that can be produced in 8 bits and thus the true value is unknown.

The camera 10 is operable to distinguish between valid and invalid phase-correlation values, and in some embodiments the accumulator 32 determines the accumulated correlation as a sum of only valid phase-correlation values. In some embodiments, a weighted and/or normalized sum of the phase-correlation values is employed.

The mask updater 34 updates an invalid-pixel mask to indicate which pixel positions of the depth map and amplitude image are invalid by association with invalid phase-correlation value(s). In some embodiments, the mask updater 34 is not employed and invalid pixels positions are not tracked by the camera 10.

The depth-map generator 36 is operable to generate the depth map in response to the accumulated correlations determined by the accumulator 32. In some embodiments, the depth-map generator 36 generates the depth map in response to the accumulated correlations and the invalid-pixel mask determined by the mask updater 34.

The normalizer 38 is operable to generate a normalization mask useable to scale the accumulated correlations determined by the accumulator 32. The normalizer 38 is an optional component that advantageously produces scaling factors for the amplitude image, such as to comply with limitations of digital displays used to present the amplitude image for human viewing. In some embodiments, however, the normalization mask can be used to minimize or eliminate distortions in the amplitude image that are introduced by the accumulated correlations produced by the accumulator 32. In embodiments in which the normalization mask is corrective, the normalization mask indicates for each pixel position a sum associated with all valid exposure durations, where an exposure duration is considered valid if it is associated with a valid set of phase-correlation values. A set of phase-correlation values is considered valid if all of the phase-correlation values contained therein are valid.

In a variation, the normalizer 38 determines a sum of exposure-duration ratios in which each such ratio represents a ratio of a valid exposure duration and a reference exposure duration. The reference exposure duration may be the longest exposure duration selected by the exposure-duration selector 22, for example. In further variations, the normalizer 38 determines a weighted sum of valid exposure durations or a weighted sum of valid exposure-duration ratios. Other variations are possible.

The amplitude-image generator 40 generates the amplitude image in response to the accumulated correlations determined by the accumulator 32. The amplitude image can be scaled as desired for compatibility with any suitable display technique. In some embodiments, the amplitude-image generator 40 generates the amplitude image in response to the accumulated correlations and the normalization mask generated by the normalizer 38.

While FIG. 1 shows the phase-offset selector 16, exposure-duration selector 22, correlator 30, accumulator 32, mask updater 34, depth-map generator 36, normalizer 38, and amplitude-image generator 40 as various functional blocks of the processor 14, indicating that each function is implemented as software-programming instructions stored within digital memory of the camera 10 in communication with the processor 14, in general any one or more of such functions may be implemented in any suitable manner including as functionally equivalent discrete hardware components; one or more integrated circuits (IC), including being implemented by a monolithic integrated circuit (MIC), an Application Specific Integrated Circuit (ASIC), a Field Programmable Gate Array (FPGA), programmable logic controller (PLC), or similar; remotely accessible Software-as-a-Service (SaaS) in direct or indirect wired or wireless communication with the camera 10; or any combination thereof for example.

Thus, there is provided a time-of-flight camera operable to generate a depth map, the camera comprising a time-of-flight image sensor having a plurality of pixels, the camera comprising a processor configured to: (a) determine, at each said pixel, a plurality of phase-correlation values associated with at least one exposure duration and at least one phase offset; (b) determine, for said each pixel, an accumulated correlation in response to the plurality of phase-correlation values; and (c) generate the depth map in response to a plurality of the accumulated correlations associated with the plurality of pixels.

Method of Operation

Figure 2:
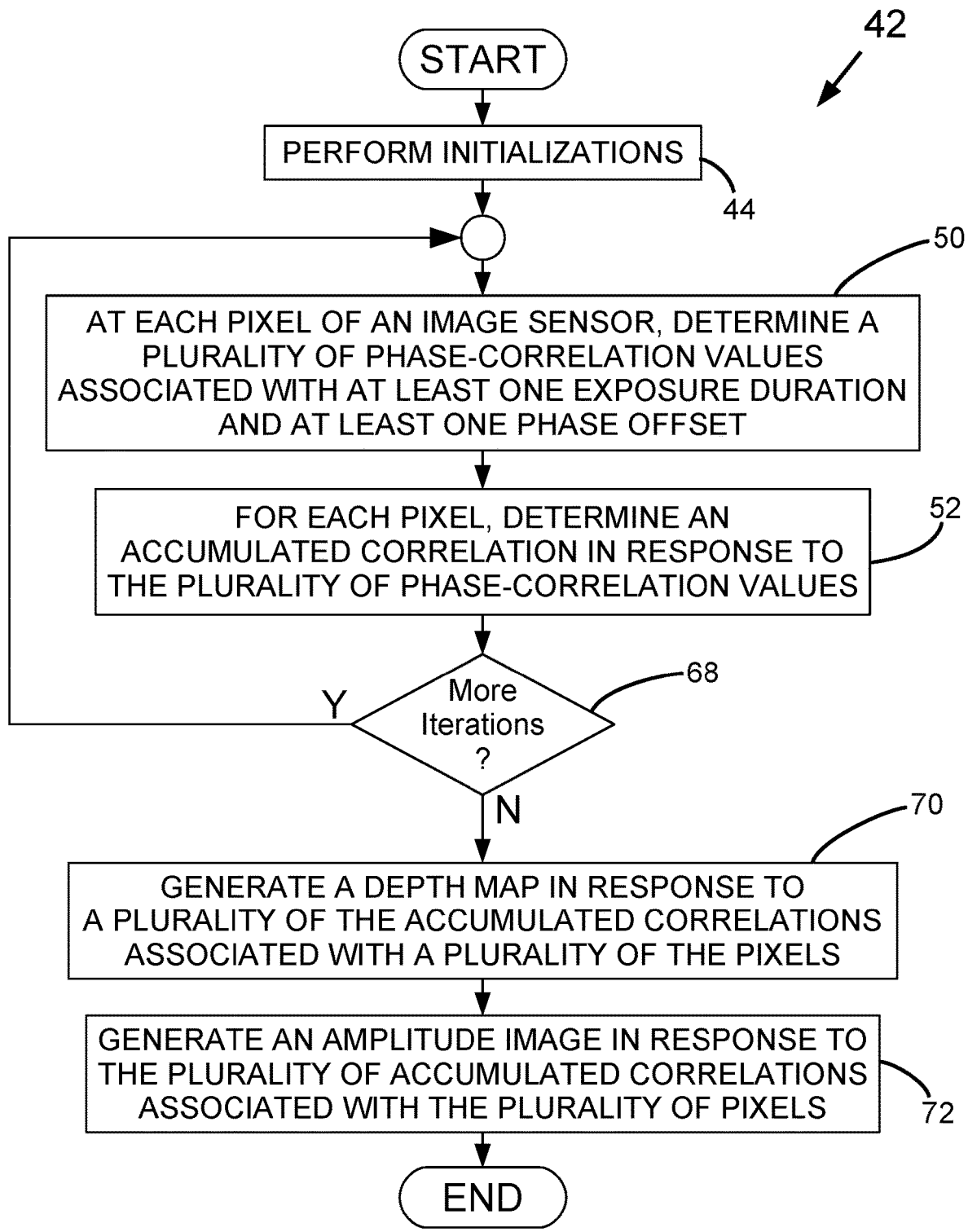
FIG. 2 is a flow diagram of a method of operation of the time-of-flight camera shown in FIG. 1, showing a method step of generating a depth map in response to a plurality of accumulated correlations associated with a plurality of pixels.

Referring to FIG. 2, digital memory associated with the processor 14 (FIG. 1) in accordance with embodiments of the invention contains blocks of code comprising computer executable instructions for directing the processor 14 to perform the steps of a method shown generally at 42. Additionally or alternatively, such blocks of code may form part of a computer program product comprising computer executable instructions embodied in a signal bearing medium, which may be a recordable computer readable medium or a signal transmission type medium, for example.

When electrical power is being supplied to the processor 14 and its associated digital memory, the processor 14 is directed to begin executing the instructions of block 44. Block 44 then directs the processor 14 to perform initializations.

First Embodiment

Referring to FIG. 3, an exemplary method according to a first embodiment for directing the processor 14 (FIG. 1) to perform steps of block 44 (FIG. 2) is shown generally at 46. Method 46 begins execution at block 48, which directs the processor 14 to initialize memory allocated for storing accumulated correlations to representing zeros, such as by writing the value of zero to each accumulated correlation stored in memory or otherwise indicating that the accumulated correlations are all zeros. By block 48, the processor 14 is also directed to initialize memory allocated for storing an invalid-pixel mask to representing all valid, such as by writing a bit value representing valid to each pixel-associated bit of the invalid-pixel mask or otherwise indicating by the invalid-pixel mask that the mask is valid at all of its pixel positions.

After block 48 has been executed, the processor 14 is then directed to exit from the method 46 and return to the method 42 of FIG. 2 at block 50 thereof.

Referring back to FIG. 2, block 50 directs the processor 14 to determine, at each pixel 26 of the sensor 28 (FIG. 1), a plurality of phase-correlation values associated with at least one exposure duration and at least one phase offset; and block 52 directs the processor 14 to determine, for each pixel 26, an accumulated correlation in response to the plurality of phase-correlation values. In the first embodiment, determining the plurality of phase-correlation values involves the processor 14 receiving the plurality of phase-correlation values from the sensor 28.

Referring to FIG. 4, an exemplary method for directing the processor 14 to perform steps of blocks 50 and 52 (FIG. 2) is shown generally at 54. Method 54 begins execution at block 56, which directs the processor 14 to select a phase offset, such as by controlling the phase-offset selector 16 (FIG. 1) to select the phase offset.

Referring to FIGS. 1 and 4, block 58 then directs the processor 14 to perform a sequence of operations as follows:
(i) control the optical source 18 to emit the modulated optical energy 20 after it has been modulated according to the phase offset selected by operation of block 56;
(ii) for each pixel 26, determine a reflected signal; and
(iii) for each pixel 26, determine a phase-correlation value representing a phase difference between the modulating and reflected signals.

The operation (i) above is typically performed by modulating an optical carrier with a periodic RF signal having the selected phase offset and emitting the modulated optical carrier for a period of time associated with an exposure duration selected by the exposure-duration selector 22 (FIG. 1). The operation (ii) above is typically performed by the sensor 28 sensing the reflected optical energy 24 and then demodulating the reflected optical energy 24 received at each pixel 26 to produce a reflected signal for each pixel 26. The operation (iii) above is typically performed by the sensor 28 determining by analog electronic circuitry a mathematical correlation between the modulating and reflecting signals during the exposure duration previously selected by the exposure-duration selector 22. In some embodiments, components of the camera 10 other than the sensor 28 may perform operations (ii) and/or (iii). In some embodiments, the phase-correlation values are determined by computations of the camera 10, such as by digital signal processing; digital processing by the processor 14; or by other digital techniques.

Block 60 directs the processor 14 to weight the phase-correlation values. In some embodiments, it may be advantageous to apply a weighting function to the phase-correlation values, such as for improving noise performance, improving other performance parameters, or to implement a trade-off between different performance parameters. The weighting function may be any suitable function, and typically applies different weights to the phase-correlation values associated with different pixels 26 to achieve desired effects. In the first embodiment, however, weighting is optional and block 60 is typically omitted.

Block 62 directs the processor 14 to increment each accumulated correlation by its corresponding phase-correlation value. In the first embodiment, for each pixel 26 of the sensor 28 (FIG. 1) there is one accumulated correlation associated with each phase offset selected by block 56. Also in the first embodiment, one phase-correlation value is determined for each pixel 26 for each iteration of block 58, and each iteration of block 58 is associated with a different phase offset. By block 44 (FIG. 2), the initial value of each accumulated correlation is zero. By block 62, the value of each accumulated correlation is incremented by the phase-correlation value, or weighted phase-correlation value in some embodiments, associated with the same pixel 26 and the same phase offset. Incrementing the accumulated correlation typically involves replacing the current value of the accumulated correlation by the sum of the current value and its corresponding phase-correlation value. In this manner, the value of each accumulated correlation increases with each related iteration of block 62. In some embodiments, a weighting function is applied to the accumulated correlations before or after being incremented by block 62. In the first embodiment, however, weighting is optional. After the accumulated correlations have been incremented by each iteration of block 62, the associated phase-correlation values can be overwritten in the camera 10 memory, thereby allowing such memory locations to be re-used. Thus, the memory required to store the phase-correlation values can be advantageously minimized in the first embodiment.

Block 64 directs the processor 14 to update the invalid-pixel mask that had previously been initialized by block 48 (FIG. 3). In the first embodiment, a given pixel 26 is invalid if any phase-correlation value determined for that pixel 26 is invalid. Thus, each pixel position of the invalid-pixel mask is updated from valid to invalid whenever a first phase-correlation value for that pixel position is determined to be invalid, such as by having a value that indicates saturation of the corresponding pixel 26. In the first embodiment, when a pixel position of the invalid-pixel mask is changed from valid to invalid, it is not changed thereafter during method 42 (FIG. 2). Thus, in the first embodiment the invalid-pixel mask indicates for each pixel position thereof that at least one phase-correlation value determined for that pixel position was invalid.

Block 66 directs the processor 14 to determine whether there are more phase offsets for further iterations of blocks 56 to 66.

If by block 66 the processor 14 determines there are more phase offsets, the process returns to block 56 for another iteration of blocks 56 to 66 in accordance with another, typically different, phase offset. In general, any suitable phase offsets may be employed, the same phase offset may be employed multiple times for redundancy, and pre-defined sets of phase offsets may be employed. In an exemplary scenario, the phase offsets of 0 and 180 degrees, or the phase offsets of 0, 90, 180, and 270 degrees, may be employed to minimize the effect of variations between different pixels 26 in sensitivity and other performance parameters. Repeating the sequence of phase-correlation image capture multiple times for different phase offsets increases the time required to capture and process a given scene, and thus may not be suitable for capturing quickly moving objects 12 and/or slow processor 14 speeds.

In the first embodiment, the exposure duration is a constant value such that each iteration of blocks 56 to 66 employs the same exposure duration each time.

In a variation of the first embodiment, the invalid-pixel mask may be employed by any one or more of blocks 58, 60, and 62 to avoid performing computations in respect of pixels 26 already determined to be invalid. Accordingly, for each pixel 26 previously determined to be invalid, its associated phase-correlation value need not be determined, its associated phase-correlation value need not be weighted, and its associated accumulated correlation need not be incremented. Thus, unnecessary processing can be avoided, such as by determining the accumulated correlation as a sum of valid ones of the phase-correlation values. In such embodiments, the order in which blocks 60, 62, and 64 are executed may be varied. For example, block 64 may be performed prior to blocks 60 and/or 62 so that the most recent determination of invalid phase-correlation values is used to determine which phase-correlation values to weight and/or accumulate, respectively. In the first embodiment, however, blocks 58, 60, and 62 direct the processor 14 to perform their respective operations for all pixels 26, including invalid pixels 26, so as to advantageously avoid the computational overhead of selecting the processing to be performed. Computed values associated with invalid pixels 26 can be subsequently ignored.

If by block 66 it is determined that there are no more phase offsets to be processed, the processor 14 is then directed to exit from the method 54 and return to the method 42 of FIG. 2 at block 68 thereof.

Referring back to FIG. 2, block 68 directs the processor 14 to determine whether there are more iterations of blocks 50 and 52 to be performed.

If by block 68 the processor 14 determines there are more iterations to be performed, the process returns to block 50 for another iteration of blocks 50 and 52.

In the first embodiment, blocks 50 and 52 may be iterated any desired number of times, with each iteration employing the same exposure duration and the same pre-defined set of phase offsets. With each iteration of blocks 50 and 52, the value of the accumulated correlation associated with a given pixel 26 and a given phase offset increases. In this manner, the accumulated correlation represents a sum total of the phase-correlation values determined for a given pixel 26 in association with a given phase offset. Such accumulated correlation advantageously represents a higher signal-to-noise ratio than each of its constituent phase-correlation values. Accordingly, a relatively shorter exposure duration may be employed when determining each phase-correlation value, thereby reducing the likelihood of any given pixel 26 becoming saturated due to the limited dynamic range of the sensor 28. In this manner, improved dynamic range can advantageously be achieved without impairing signal-to-noise ratio.

If by block 68 it is determined that there are no more iterations to be performed, the processor 14 is then directed to execute block 70.

Block 70 directs the processor 14 to generate a depth map in response to a plurality of the accumulated correlations associated with a plurality of the pixels. The depth map indicates the distance between the camera 10 and various objects 12 as measured at each pixel 26 (FIG. 1). Any suitable number of accumulated correlations may be associated with each pixel 26. For each iteration of blocks 50 and 52 of FIG. 2 there may be, for example, four iterations of method 54 (FIG. 4) in respect of a pre-defined set of four phase offsets (e.g. 0, 90, 180, and 270 degrees) to produce four accumulated correlations $\hat{C}0$, $\hat{C}1$, $\hat{C}2$, and $\hat{C}3$ associated with each pixel 26. In such exemplary embodiments, for any number of iterations of blocks 50 and 52 of FIG. 2, the depth-map value for a given pixel 26 is calculated by the following equation:

$$d = \left(\frac{S}{4*\pi*f_{mod}}\right)*\tan^{-1}\left(\frac{\hat{C}_3 - \hat{C}_1}{\hat{C}_0 - \hat{C}_2}\right) \quad (1)$$

where
d=the depth-map distance determined for that given pixel 26;
S=the speed of light;
$f_{mod}$=the frequency of the modulating signal of block 58 (FIG. 4);
$\hat{C}_0$=the accumulated correlation determined for that given pixel 26 in association with the first-selected phase offset (e.g. 0 degrees);
$\hat{C}_1$=the accumulated correlation determined for that given pixel 26 in association with the second-selected phase offset (e.g. 90 degrees);
$\hat{C}_2$=the accumulated correlation determined for that given pixel 26 in association with the third-selected phase offset (e.g. 180 degrees); and
$\hat{C}_3$=the accumulated correlation determined for that given pixel 26 in association with the fourth-selected phase offset (e.g. 270 degrees).

Other phase offsets used in a different sequence may be suitably employed, with corresponding changes being made to the formula for determining the depth map.

Block 72 directs the processor 14 to generate an amplitude image in response to the plurality of accumulated correlations associated with the plurality of pixels. The amplitude image is a grey-scale representation of the scene within the field of view of the camera 10, which is typically suitable for human viewing when displayed on a digital display. In some embodiments, the amplitude image is normalized, such as by dividing the amplitude at each pixel 26 by a normalization scaling factor equal to the number of iterations of blocks 50 and 52 that had been invoked to produce the accumulated correlations. In this manner, overloading a digital display may be avoided. Other normalization factors may be employed, depending on the specific display being employed for example. In exemplary embodiments in which, for each iteration of blocks 50 and 52 of FIG. 2, there are four iterations of blocks 56 to 66 (FIG. 4) in respect of a pre-defined set of four phase offsets (e.g. 0, 90, 180, and 270 degrees) to produce four accumulated correlations $\hat{C}0$, $\hat{C}1$, $\hat{C}2$, and $\hat{C}3$ associated with each pixel 26, the amplitude-image value for a given pixel 26 is calculated by the following equation:

$$A = \frac{1}{2*N} * \sqrt{(\hat{C}_0 - \hat{C}_2)^2 + (\hat{C}_3 - \hat{C}_1)^2} \quad (2)$$

where
A=the amplitude determined for that given pixel 26;
N=the normalization scaling factor;
$\hat{C}_0$=the accumulated correlation determined for that given pixel 26 in association with the first-selected phase offset (e.g. 0 degrees);
$\hat{C}_1$=the accumulated correlation determined for that given pixel 26 in association with the second-selected phase offset (e.g. 90 degrees);
$\hat{C}_2$=the accumulated correlation determined for that given pixel 26 in association with the third-selected phase offset (e.g. 180 degrees); and
$\hat{C}_3$=the accumulated correlation determined for that given pixel 26 in association with the fourth-selected phase offset (e.g. 270 degrees).

In the first embodiment, the normalization scaling factor N is equal to the number of iterations of blocks 50 and 52 of FIG. 2. In a variation, however, normalization is not employed (i.e. N=1) and the amplitude image is not normalized. Alternatively, other normalization scaling factors may be employed. Block 72 itself is optional and is omitted from some embodiments.

After executing block 72 (or 70, where block 72 is omitted), the processor 14 is directed to end the method 42.

In variations of the first embodiment, the order in which iterations of method 54 (FIG. 4) and iterations of blocks 50 and 52 (FIG. 2) may be varied, including possibly being reversed such that the processor 14 is directed to sequentially determine for each pixel 26 a plurality of phase-correlation values associated with one phase offset before proceeding to the next phase offset. In general, the phase-correlation values associated with different phase offsets and different iterations of blocks 50 and 52 of FIG. 2 may occur in any order, provided each accumulated correlation is incremented before its corresponding phase-correlation value is overwritten with a new phase-correlation value.

Figure 5:
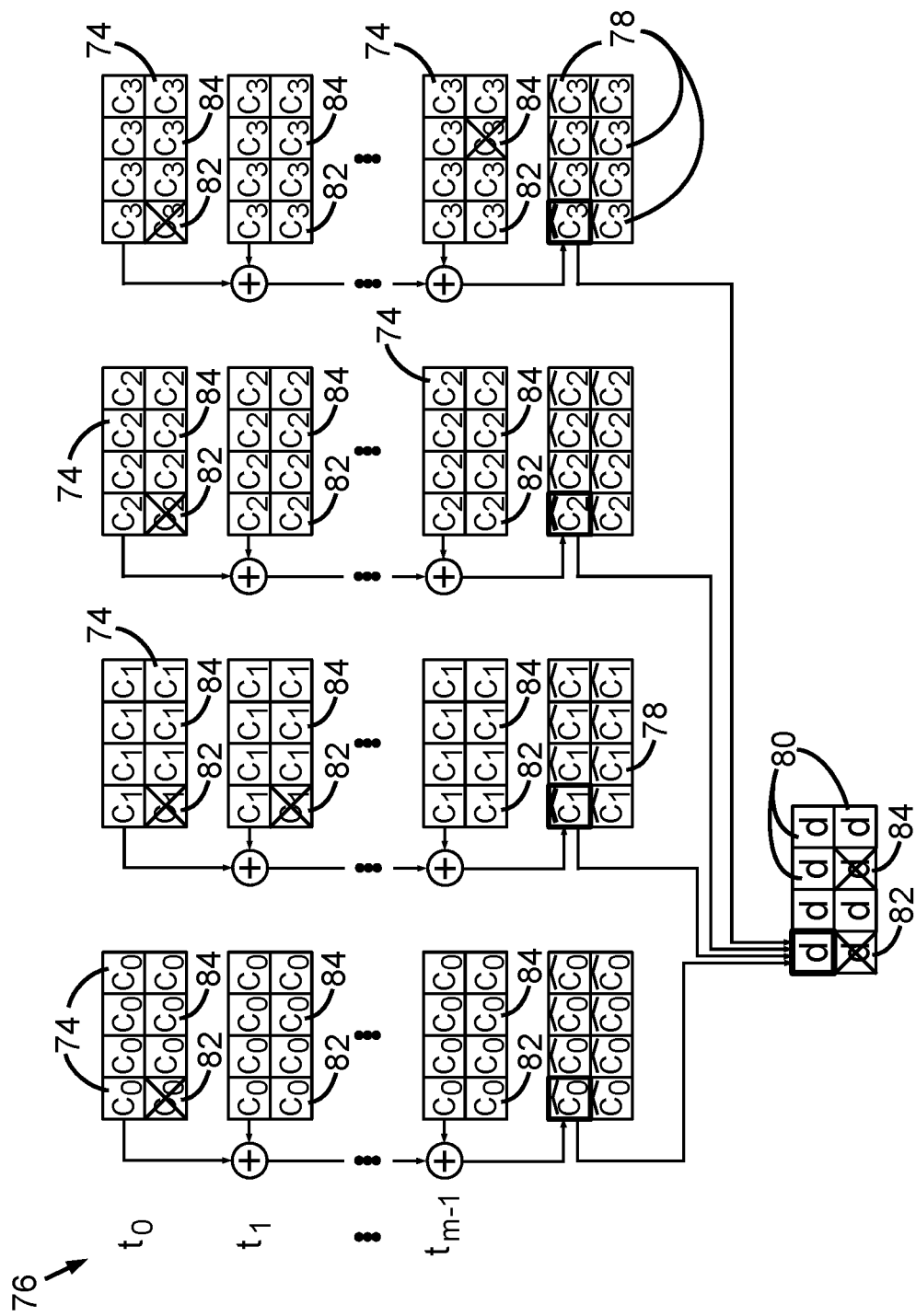
FIG. 5 is a block diagram of a time sequence of operations of a time-of-flight image sensor of the camera of FIG. 1, showing a depth map that is invalid at certain pixel positions according to the first embodiment.

Referring to FIG. 5, the sensor 28 (FIG. 1) is represented for ease of illustration as having eight pixels 26, although in general any number of pixels 26 may be employed.

The representations 74 of exemplary phase-correlation values C0, C1, C2, and C3 associated with the first, second, third, and fourth exemplary phase offsets (e.g. 0, 90, 180, and 270 degrees), respectively, are shown at different times along a timeline 76. The first time t0 represents a first set of invocations of method 54 (FIG. 4), the second time t1 represents a second set of iterations of method 54, and so on. At each set of iterations of method 54, the exemplary phase-correlation values C0, C1, C2, and C3 are sequentially determined by separate invocations of the method 54. Invalid phase-correlation values are represented in FIG. 5 by crossed strikethroughs. Although represented in FIG. 5 by the same symbol, the various phase-correlation values associated with the same phase offset will have in general different values for different pixels 26 and/or at different times.

The representations 78 of the accumulated correlations associated with each pixel 26 and for each exemplary phase offset are shown in FIG. 5 by the symbols $\hat{C}0$, $\hat{C}1$, $\hat{C}2$, and $\hat{C}3$. Although represented in FIG. 5 by the same symbol, the various accumulated correlations associated with the same phase offset will in general have different values for different pixels 26.

The representations 80 of depth-map values at each pixel position are shown in FIG. 5 by the symbol "d". In the exemplary scenario of FIG. 5, some of the phase-correlation values at pixel positions 82 and 84 are invalid. In accordance with the first embodiment, the depth map is considered invalid at a given pixel position if any one corresponding phase-correlation value is invalid. As shown in FIG. 5, the depth map is invalid at pixel positions 82 and 84.

Second Embodiment

Referring back to FIG. 2, block 44 of the method 42 directs the processor 14 (FIG. 1) to perform initializations.

Figure 6:
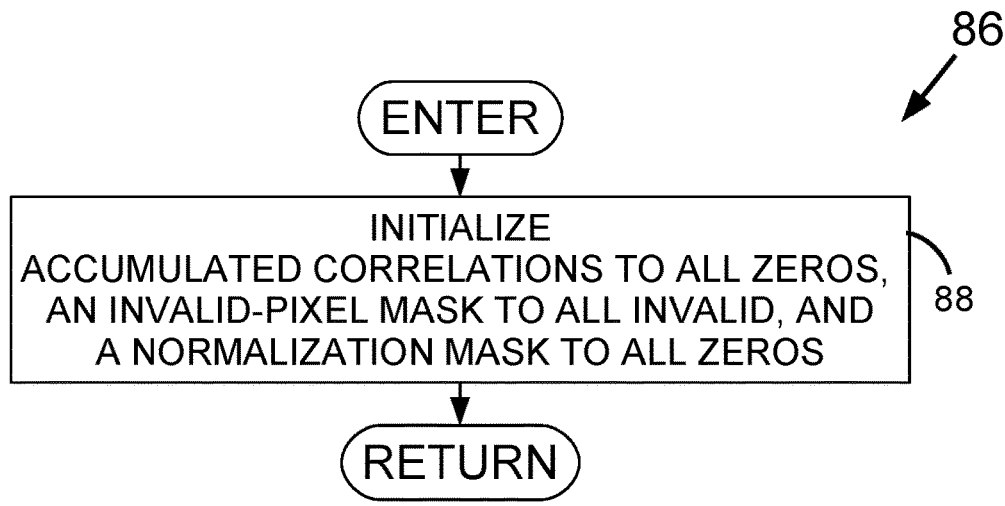
FIG. 6 is a flow diagram of an exemplary method for performing the first method step of FIG. 2, showing initializations according to a second embodiment of the invention.

Referring to FIG. 6, an exemplary method according to a second embodiment for directing the processor 14 to perform steps of block 44 (FIG. 2) is shown generally at 86. Method 86 begins execution at block 88, which directs the processor 14 to initialize memory allocated for storing accumulated correlations to representing zeros; to initialize memory allocated for storing an invalid-pixel mask to representing all invalid, such as by writing a value representing invalid into each pixel position of the invalid-pixel mask or otherwise indicating that the mask is invalid at all of its pixel positions; and to initialize memory allocated for storing a normalization mask to representing zeros.

After block 88 has been executed, the processor 14 is then directed to exit from the method 86 and return to the method 42 of FIG. 2 at block 50 thereof.

Referring back to FIG. 2, block 50 directs the processor 14 to determine, at each pixel 26 of the sensor 28 (FIG. 1), a plurality of phase-correlation values associated with at least one exposure duration and at least one phase offset.

Figure 7:
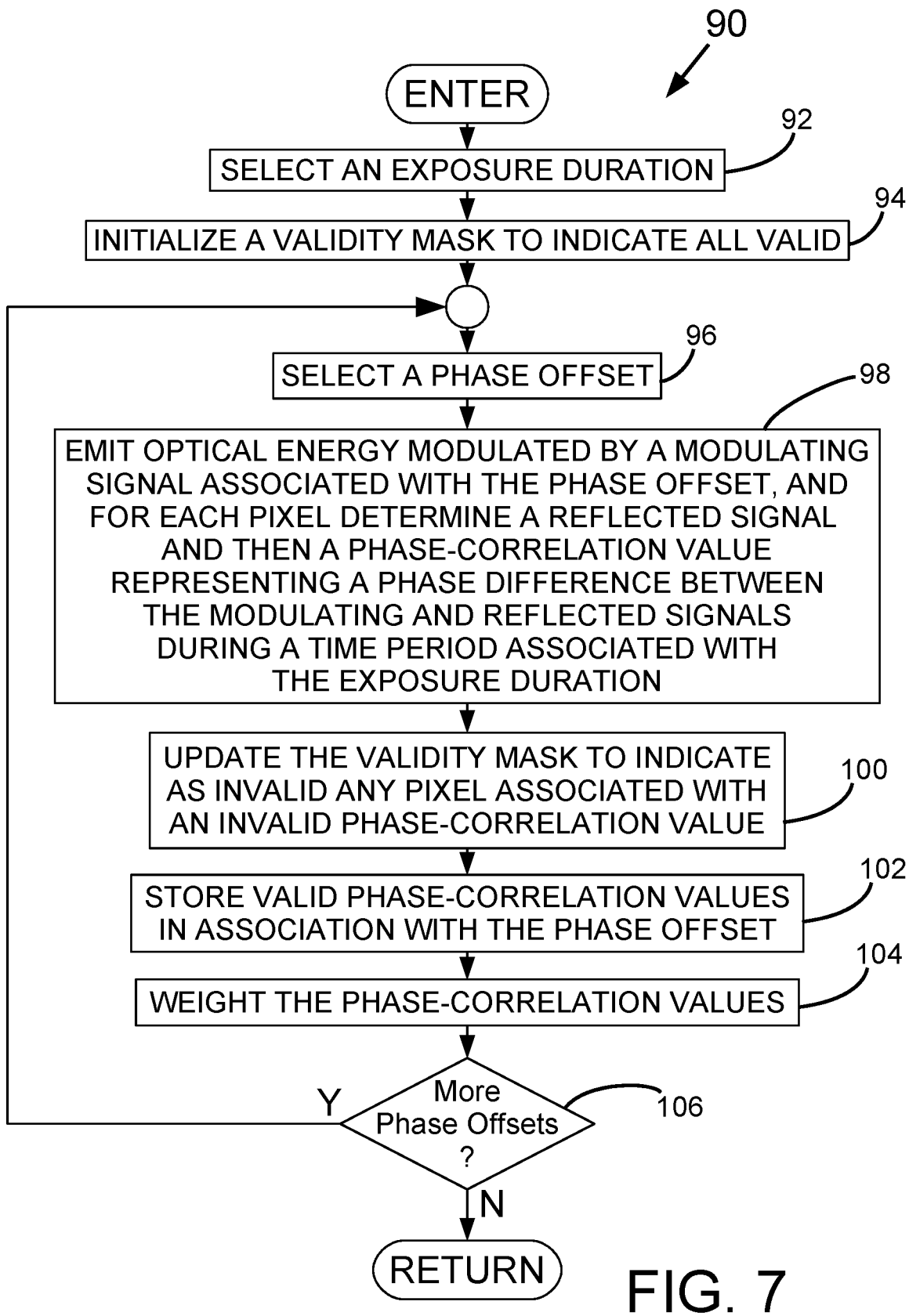
FIG. 7 is a flow diagram of an exemplary method for performing the second method step of FIG. 2, showing a step of determining phase-correlation values according to the second embodiment.

Referring to FIG. 7, an exemplary method for directing the processor 14 to perform steps of block 50 (FIG. 2) is shown generally at 90. Method 90 begins execution at block 92, which directs the processor 14 to select an exposure duration. In the second embodiment, a pre-defined set of exposure durations is employed and each exposure duration of the pre-defined set is unique. For example, the exposure durations of 2 millisecond (ms), 4 ms and 8 ms may form a pre-defined set of exposure durations. Other exposure durations are possible, and are typically constrained by the performance characteristics of the particular image sensor 28 being employed.

In some embodiments, dynamic selection of exposure duration(s) is employed such that block 92 directs the processor 14 to select an exposure duration on the basis of one or more operating and/or performance parameters. Such parameters may include previously used exposure duration(s), number of invalid pixels 26 associated with a previously used exposure duration, a previously measured depth value, a computed parameter such as average depth, or any combination thereof for example.

Various sensors 28 may be compatible with various limited ranges of exposure durations, such as less than 1 ms, between 2 and 10 ms, or other ranges for example. In an exemplary embodiment in which the sensor 28 is compatible with exposure durations in the range of 2 to 8 ms, for example, the set of exposure durations may be pre-defined as 2 ms, 4 ms, and 8 ms for example.

Block 94 directs the processor 14 to initialize memory allocated for storing a validity mask to representing all valid, such as by writing a value representing valid into each pixel position of the validity mask or otherwise indicating that the validity mask is valid at all of its pixel positions. In the second embodiment, the validity mask is stored separately from the invalid-pixel mask.

Block 96 directs the processor 14 to select a phase offset, such as by controlling the phase-offset selector 16 (FIG. 1) to select the phase offset.

Figure 8:
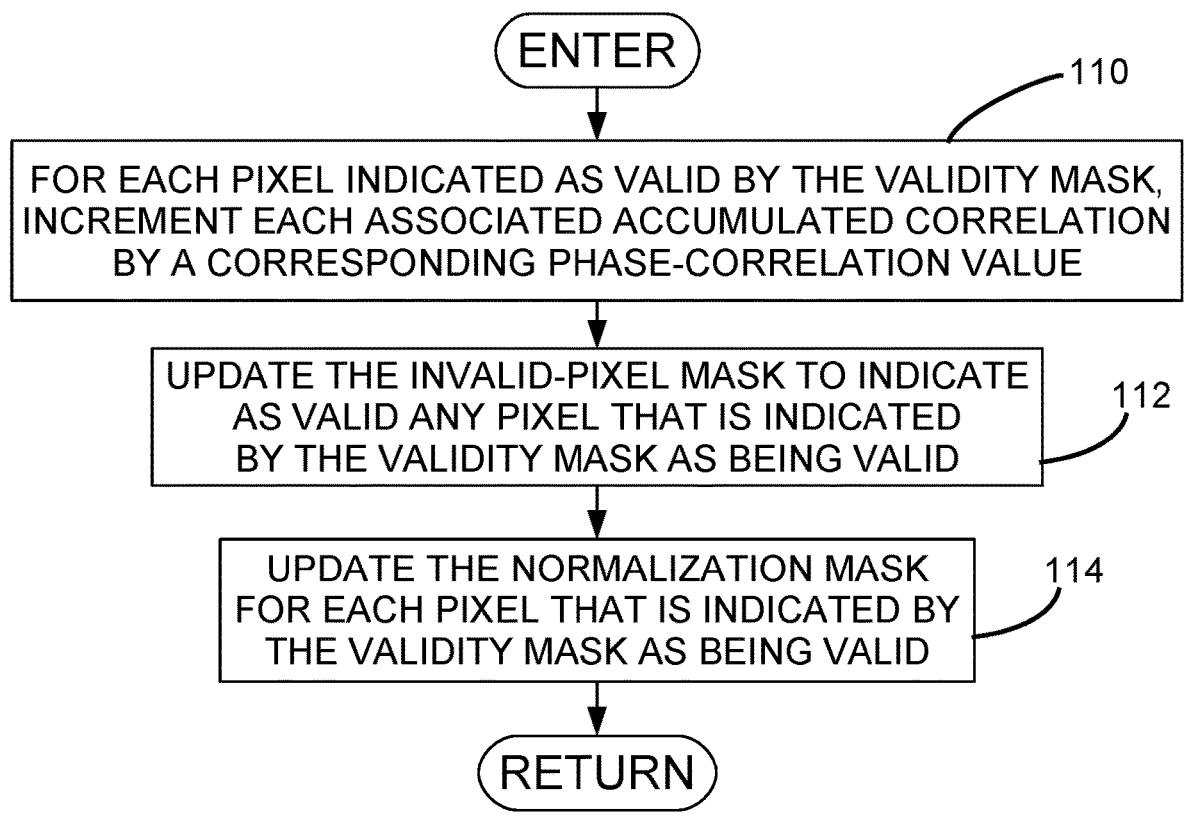
FIG. 8 is a flow diagram of an exemplary method for performing the third method step of FIG. 2, showing a step of determining an accumulation correlation according to the second embodiment.

Referring to FIGS. 1 and 8, block 98 then directs the processor 14 to perform a sequence of operations as follows:
(i) control the optical source 18 to emit the modulated optical energy 20 after it has been modulated according to the phase offset selected by operation of block 96;
(ii) for each pixel 26, determine a reflected signal; and
(iii) for each pixel 26, determine a phase-correlation value representing a phase difference between the modulating and reflected signals during a time period associated with the exposure duration selected by block 92.

The operation (i) above is typically performed by modulating an optical carrier with a periodic RF signal having the selected phase offset. The operation (ii) above is typically performed by the sensor 28 sensing the reflected optical energy 24 and then demodulating the reflected optical energy 24 received at each pixel 26 to produce a reflected signal for each pixel 26. The operation (iii) above is typically performed by the sensor 28 determining by analog electronic circuitry a mathematical correlation between the modulating and reflecting signals during the exposure duration previously selected by the exposure-duration selector 22 in accordance with block 92. In some embodiments, components of the camera 10 other than the sensor 28 may perform operations (ii) and/or (iii). In some embodiments, the phase-correlation values are determined by computations of the camera 10, such as by digital signal processing; digital processing by the processor 14; or by other digital techniques.

Block 100 shown in FIG. 7 directs the processor 14 to update the validity mask to indicate as invalid any pixel 26 associated an invalid phase-correlation value. In the second embodiment, when a pixel position of the validity mask is changed from valid to invalid, it is not changed thereafter until the validity mask is next re-initialized by block 94.

Block 102 directs the processor 14 to store valid phase-correlation values in association with the phase offset previously selected by block 96. In some embodiments, invalid values are not stored. In the second embodiment, all phase-correlation values, whether or not valid, are typically stored for the advantage of simplifying computational control.

Block 104 directs the processor 14 to weight the phase-correlation values. In some embodiments, it is advantageous to apply a weighting function to the phase-correlation values, such as for improving noise performance, improving other performance parameters, or to implement a trade-off between different performance parameters. The weighting function may be any suitable function, and typically applies different weights to the phase-correlation values associated with different pixels 26 to achieve desired effects. In some embodiments using the weighting function, the weighting function is not applied to invalid phase-correlation values. However, in a variation all phase-correlation values, whether or not valid, are weighted. In some embodiments, a weighting function is not used and block 104 is omitted.

An exemplary weighting function that can advantageously be applied to the phase-correlation values is a generalized inverse-variance weighting function, which may be suitably employed to maximize the signal-to-noise ratio of the resulting depth map and amplitude image. For example, each exposure duration selected by block 92 may be multiplied by the inverse of the noise variance for its associated pixel 26 at that exposure duration.

A simplification of generalized inverse-variance weighting is to define a fixed weight based on the currently selected exposure duration. In some embodiments, the fixed weight equals a ratio between the current exposure duration and a reference exposure duration raised to a selected power, as given by the following equation:

$$w_i = \left(\frac{E_i}{E_{ref}}\right)^p \quad (3)$$

where
$w_i$=the weight used in association with the ith exposure duration;
$E_i$=the ith exposure duration;
$E_{ref}$=the reference exposure duration; and
p=a selected exponent.

The power p is typically selected as a constant in the range of −1 to 1 to advantageously achieve desired performance objectives. A value of p at or near zero (0) may suitably be used when the camera 10 system is shot-noise limited, and a value of p at or near one (+1) may suitably be used when the camera 10 system is read-noise limited, for example. A compromise between these two extremes can be selected as p=0.5, in which case each current weight is equal to the square root of the ratio of the current exposure duration and the reference exposure duration.

As a further example, a value of p at or near negative one (−1) may suitably be used when it is desirable to accumulate the phase-correlation values by the same or similar average amounts with each iteration of block 98 despite using different exposure durations. Weighting with a value of p=−1, however, degrades noise performance of the camera 10 in comparison to selecting a value of p in the range of 0 to 1. Selecting the value of p=−1 produces inverse weighting in comparison to selecting the value of p=+1.

As particular examples of the weighting function above, the reference exposure duration can be selected as one of the pre-defined exposure durations. For example, if the value of p is in the range of 0 to 1, then the reference exposure duration is typically selected as the shortest exposure duration among those selected by block 92. By way of specific example, if the pre-defined set of exposure durations is {2 ms, 4 ms, 8 ms} and the reference exposure duration is the shortest exposure duration, then the increments of 1, 2, and 4 are employed, respectively, and the largest possible value for each scaling factor of the weighting function is 7.

In some embodiments, if p=−1, then the reference exposure duration is typically selected as the longest exposure duration among those selected by block 92. By way of specific example, if the pre-defined set of exposure durations is {2 ms, 4 ms, 8 ms} and the reference exposure duration is the longest exposure duration, then the increments of 4, 2, and 1 are employed, respectively. In this manner, the contribution of valid phase-correlation values corresponding to each accumulated correlation is independent of the particular exposure duration employed. For example, an exposure duration that is one-fourth of the longest exposure duration employed results in valid contributions being multiplied by four. Such weighting using p=−1, however, results in contributions associated with shorter exposure durations begin weighted more than contributions associated with longer exposure durations, which typically degrades the signal-to-noise ratio of the resulting depth map and amplitude image.

In a simple case, the reference exposure duration equals the constant one (1) and p=+1, such that the weighting is equal to the current exposure duration. In this example, if the pre-defined set of exposure durations is {2 ms, 4 ms, 8 ms}, then the increments of 2 ms, 4 ms, and 8 ms are respectively used whenever valid for a given pixel 26, and the largest possible value for each scaling factor of the normalization mask is 14 ms. Setting the reference exposure duration to the value of one can result in increased memory requirements relative to selecting the reference exposure duration as the longest or shortest exposure duration.

Block 106 directs the processor 14 to determine whether there are more phase offsets for further iterations of blocks 96 to 104.

If by block 106 the processor 14 determines there are more phase offsets, the process returns to block 96 to select another, typically different, phase offset. In the exemplary scenario described herein, the phase offsets of 0, 90, 180, and 270 degrees are employed as a pre-defined set of phase offsets. In such exemplary embodiment, each iteration of blocks 96 to 104 employs a different phase offset selected from the pre-defined set, and blocks 96 to 104 are iterated four times for each invocation of the method 90. Other arrangements and values of phase offsets are possible. In the second embodiment, each iteration of blocks 96 to 104 employs the exposure duration selected by block 92.

If by block 106 it is determined that there are no more phase offsets, such as by having iterated through all phase offsets of the pre-defined set of phase offsets, the processor 14 is then directed to exit from the method 90.

In the second embodiment, the phase-correlation values determined for a given pixel 26 in response to a given exposure duration form one set of phase-correlation values associated with that pixel 26 and that exposure duration. In some embodiments employing weighted phase-correlation values, the weighting function is applied to the phase-correlation values of an entire set after block 106 determines there are no more phase offsets, rather than at block 104 for the phase-correlation values associated with each phase offset. Other variations are possible.

Upon completion of the method 90, if all phase-correlation values associated with all phase offsets associated with a given pixel 26 and exposure duration are valid, then the validity mask indicates that the given pixel 26 is valid. Otherwise, the validity mask indicates the given pixel 26 is invalid. Thus, the validity mask indicates for each pixel 26 whether any phase-correlation value associated with any phase offset for that pixel 26 and that exposure duration is invalid.

After exiting method 90, the process returns to the method 42 of FIG. 2 at block 52 thereof.

Referring back to FIG. 2, block 52 directs the processor 14 to determine, for each pixel, an accumulated correlation in response to the plurality of phase-correlation values.

Referring to FIG. 8, an exemplary method for directing the processor 14 to perform steps of block 52 (FIG. 2) is shown generally at 108. Method 108 begins execution at block 110, which directs the processor 14 to increment, for each pixel 26 indicated as valid by the validity mask, each accumulated correlation associated with that pixel 26 by its corresponding phase-correlation value. In the second embodiment, for each pixel 26 of the sensor 28 (FIG. 1) there is one accumulated correlation associated with each phase offset selected by block 96 (FIG. 7). Incrementing each associated accumulated correlation typically involves replacing the current value of each accumulated correlation associated with a given pixel 26 and phase offset by the sum of its current value and its corresponding phase-correlation value, provided that the associated pixel 26 is valid according to the validity mask. Each pixel 26 is valid in association with a given exposure duration if all phase-correlation values associated with that exposure duration and that pixel 26 are valid. In this manner, the value of each accumulated correlation associated with each pixel 26 increases with each related iteration of block 110 for a given exposure duration whenever all of the phase-correlation values associated with that pixel 26 and exposure duration are valid.

In embodiments employing weighted phase-correlation values, the weighting function can be applied when the phase-correlation values are being added to their corresponding accumulated correlations, rather than at block 104. In such embodiments, incrementing each associated accumulated correlation involves replacing the current value of each accumulated correlation associated with a given pixel 26 and phase offset by the sum of its current value and its corresponding phase-correlation value multiplied by the appropriate weighting, provided that the associated pixel 26 is valid according to the validity mask. Other variations are possible.

Block 112 directs the processor 14 to update the invalid-pixel mask to indicate as valid any pixel 26 that is indicated by the validity mask as being valid. To be updated as valid, all phase-correlation values of the set of phase-correlation values associated with a given pixel 26 and exposure duration must be valid. In the second embodiment, when the invalid-pixel mask is changed at a given pixel position from invalid to valid, it is not thereafter changed at that pixel position. Thus, in the second embodiment the invalid-pixel mask at a given pixel position thereof is valid even if it is valid in respect of only one exposure duration.

Block 114 directs the processor 14 to update the normalization mask for each pixel 26 that is indicated by the validity mask as being valid. The normalization mask advantageously indicates for each pixel 26 a sum associated with all valid exposure durations, where a given exposure duration associated with a given pixel 26 is a valid exposure duration if it is associated with a valid set of phase-correlation values, and where a given set of phase-correlation values associated with the given pixel 26 is valid if it contains only valid phase-correlation values.

The normalization mask is typically updated by incrementing the normalization mask at its valid pixel positions, which typically involves replacing the current value at each pixel position of the normalization mask by the sum of its current value and an increment, provided that use of the current exposure duration by method 90 (FIG. 7) resulted in a valid contribution to the accumulated correlations associated with that pixel position. In the second embodiment, the value of the increment is the current value of the exposure duration selected by block 92 (FIG. 7). Maintaining the normalization mask according to the second embodiment advantageously keeps track of the total exposure duration that is validly associated with each accumulated correlation.

In embodiments in which the valid phase-correlation values are weighted, the same weighting function that is applied to the phase-correlation values is also applied to the increment used to update the normalization mask. In such embodiments, the sum associated with all valid exposure durations is a weighted sum of such valid exposure durations. Also, maintaining the normalization mask advantageously keeps track of a weighted total exposure duration that is validly associated with each accumulated correlation. In embodiments employing the simplification of generalized inverse-variance weighting defined as a fixed weight based on the currently selected exposure duration, where the fixed weight equals a ratio between the current exposure duration and a reference exposure duration raised to a selected power, the normalization mask is determined according to the following equation:

$$m_{i+1} = m_i + (w_i * E_i) \quad (4)$$

where $m_{i+1}$=the new value of the normalization mask at a given pixel position, for replacing the current value;

$m_i$=the current value of the normalization mask at the given pixel position;

$w_i$=the weight used in association with the ith (current) exposure duration; and $E_i$=the ith (current) valid exposure duration.

While block 114 provides convenient accounting of valid exposure durations, other ways of accounting for valid uses of different exposure durations are possible, and block 114 is omitted from some embodiments.

In embodiments employing the normalization mask, a value of zero for a given pixel position indicates that the corresponding pixel 26 is invalid (or not yet valid), and any value greater than zero indicates that the corresponding pixel 26 is valid, such that block 112 may be omitted and the normalization mask can optionally be used as the invalid-pixel mask in subsequent processing.

Still referring to FIG. 8, in a variation of block 110 the normalization mask need not be initialized by block 88 (FIG. 6) and block 114 may be omitted if a form of normalization is performed each time an accumulated correlation that is valid or has previously been found valid is being incremented by block 110. By such variation, block 110 directs the processor 14 to increment each accumulated correlation by its corresponding phase-correlation value for each valid pixel 26; and also directs the processor 14 to scale each valid accumulated correlation corresponding to a currently invalid phase-correlation value, so as to maintain the desired normalization of such valid accumulated correlation. For example, the value that would otherwise be stored as current the normalization mask value can be applied to the current accumulation correlation at each calculation thereof so that the normalization mask does not need to be maintained. In embodiments employing this variation, a pre-defined set of exposure durations is typically arranged so that the exposure duration having the lowest likelihood of saturating any of the pixels 26 (e.g. the shortest exposure duration) is used first, so as to minimize the likelihood of the first invocation of method 108 of FIG. 8 resulting in a saturated pixel 26. Thereafter, if a subsequently selected exposure duration results in an invalid pixel 26, a linear extrapolation of the existing valid contributions to the accumulation correlation associated with that pixel 26 may be employed to maintain normalization of the associated accumulation correlation.

An exemplary equation for such on-the-fly normalization for valid accumulation correlations subject to a subsequent invalid phase-correlation value is as follows:

$$C_{i+1} = C_i * \frac{\sum_{j=0}^{i+1}(w_j * E_j)}{\sum_{j=0}^{i}(w_j * E_j)} \quad (5)$$

where $C_{i+1}$=the scaled accumulated correlation for replacing the current accumulated correlation;

$C_i$=the current accumulated correlation (i.e. before scaling);

$E_0$=the first-selected exposure duration;

$E_{i+1}$=the current exposure duration;

$E_i$=the preceding exposure duration;

$w_0$=the first weight;

$w_{i+1}$=the current weight; and $w_i$=the preceding weight.

By scaling the accumulated correlations in this on-the-fly variation of the second embodiment, a normalization mask is not needed. However, this variation requires special handling if the very first exposure duration results in an invalid (e.g. saturated) pixel 26, thus it is recommended to order the exposure durations from smallest to largest so as to minimize the likelihood of the first exposure duration resulting in a saturated pixel 26. If the first exposure duration used results in a given pixel 26 being invalid, that given pixel 26 can be flagged in the invalid-pixel mask as being unrecoverably invalid or special handling may be employed to recover and normalize the accumulated correlation(s) for such pixel 26 if phase-correlation values associated with a subsequent exposure duration for that pixel 26 are valid. For embodiments in which weighting is not employed, the weighting factor in the above-noted equation (5) is simplified to the constant value of one (+1).

After block 114 has been executed, the processor 14 is then directed to exit from the method 108 and return to the method 42 of FIG. 2 at block 68 thereof.

Referring back to FIG. 2, block 68 directs the processor 14 to determine whether there are more iterations of blocks 50 and 52 to be performed.

If by block 68 the processor 14 determines there are more iterations to be performed, such as by determining that all of the exposure durations of a pre-defined set of exposure durations have not yet been used, the process returns to block 50.

In the second embodiment, blocks 50 and 52 are typically executed a fixed number of times, with each execution using a different exposure duration selected from the pre-defined set of exposure durations. With each iteration of blocks 50 and 52, the respective values of the accumulated correlations increase by their corresponding phase-correlation values whenever valid. In this manner, invalid sets of phase-correlation values are excluded from their corresponding accumulated correlations. Accordingly, valid accumulation correlations are obtained even in circumstances that would otherwise result in invalid data. Thus, accurate depth maps and amplitude images can be advantageously obtained over a greater dynamic range.

If by block 68 it is determined that there are no more iterations to be performed, the processor 14 is then directed to execute block 70.

Block 70 directs the processor 14 to generate a depth map in response to the plurality of accumulated correlations associated with the plurality of pixels. In the second embodiment, the depth map is generated in an analogous manner to that described herein in respect of the first embodiment, albeit using accumulated correlations determined in accordance with the second embodiment.

Block 72 directs the processor 14 to generate an amplitude image in response to the plurality of accumulated correlations associated with the plurality of pixels. In some embodiments, the amplitude image is not normalized, such that the equation (2) for computing the amplitude image provided herein above, in which the normalization scaling factor N is equal to 1, may be used to compute the amplitude image. Without normalization, however, the amplitude image in the second embodiment includes non-linear distortions whenever the accumulated correlations for different pixels 26 are associated with different exposure durations (due to different exposure durations being excluded for the different pixels 26).

In the second embodiment, the amplitude image is typically generated on the basis of normalized accumulated correlations. Determining the normalized accumulation correlations involves dividing each accumulated correlation associated with a given pixel 26 by the scaling factor of the normalization mask that is associated with that given pixel 26, as determined in accordance with block 114, unless on-the-fly normalization of the accumulated correlations were maintained. The normalized accumulation correlations can then be employed in the equation (2) provided herein for the amplitude image. Block 72 itself is optional and may be omitted from some embodiments.

After executing block 72 (or 70, where block 72 is omitted), the processor 14 is directed to end the method 42.

In variations of the second embodiment, the order in which iterations of method 90 (FIG. 7) and the iterations of blocks 50 and 52 of FIG. 2 may be varied, including possibly being reversed such that the processor 14 is directed to sequentially determine for each pixel 26 a plurality of phase-correlation values associated with one phase offset before proceeding to the next phase offset. In general, the phase-correlation values associated with different phase offsets and different iterations of blocks 50 and 52 of FIG. 2 may occur in any order, provided each accumulated correlation is incremented before its corresponding phase-correlation value is overwritten with a new phase-correlation value.

Referring to FIG. 9, the representations 74 of exemplary phase-correlation values C0, C1, C2, and C3 associated with four exemplary phase offsets (e.g. 0, 90, 180, and 270 degrees) respectively, are shown at different times along the timeline 76. Also shown are the representations 78 of the accumulated correlations $\hat{C}0$, $\hat{C}1$, $\hat{C}2$, and $\hat{C}3$ for each pixel 26 and respectively associated with each exemplary phase offset. The representations 80 of depth-map values at each pixel position are shown in FIG. 9 by the symbol "d".

The second embodiment contrasts with the first embodiment in that, in the second embodiment, the depth map is considered invalid at a given pixel position if its corresponding pixel 26 is invalid in respect of every exposure duration used. The given pixel 26 is invalid in respect of a given exposure duration if any phase-correlation value associated with that exposure duration and that pixel 26 (i.e. at any phase offset) is invalid. In the exemplary scenario of FIG. 9, some of the phase-correlation values at pixel positions 82, 83 and 84 are invalid. As shown in FIG. 9 and assuming that m=3 in the timeline 76, the depth map is invalid at the pixel position 84 only.

Third Embodiment

Referring back to FIG. 2, features of the first and second embodiments may be combined for further variations.

For example, block 68 may direct the processor 14 to iterate blocks 50 and 52 a fixed number of times, with each iteration using a different exposure duration selected from the pre-defined set of exposure durations, according to the second embodiment, and then to iterate blocks 50 and 52 a desired number of times in respect of a particular exposure duration, such as the longest exposure duration, according to the first embodiment. Such additional repetitions can advantageously improve the signal-to-noise ratio of the depth map and amplitude image, such as when the maximum permitted exposure duration for a given camera 10 is insufficient, at the expense of increasing the time it takes for the camera 10 to capture the depth map and amplitude image.

In the third embodiment, the invalid-pixel mask is typically maintained according to the second embodiment for all iterations of blocks 50 and 52, thereby advantageously minimizing the effect of invalid pixels 26 on the resulting depth map and/or amplitude image. Alternatively, the invalid-pixel mask can be maintained according to the first or second embodiment in accordance with the particular iteration being executed, for example. Other variations in the treatment of the invalid-pixel mask are possible.

As a further example, block 68 may direct the processor 14 to iterate blocks 50 and 52 a fixed number of times according to the first and/or second embodiment and then to repeat that fixed number of iterations, so as to permit averaging of depth maps and amplitude images. Other variations are possible.

Thus, there is provided a computer-implemented method of generating a depth map using a time-of-flight image sensor having a plurality of pixels, the method comprising: (a) at each said pixel, determining by a computer processor a plurality of phase-correlation values associated with at least one exposure duration and at least one phase offset; (b) for said each pixel, determining an accumulated correlation in response to the plurality of phase-correlation values; and (c) generating the depth map in response to a plurality of the accumulated correlations associated with the plurality of pixels.

While embodiments of the invention have been described and illustrated, such embodiments should be considered illustrative of the invention only. The invention may include variants not described or illustrated herein in detail. Thus, the embodiments described and illustrated herein should not be considered to limit the invention as construed in accordance with the accompanying claims.

What is claimed is:

1. A computer-implemented method of generating a depth map using a time-of-flight image sensor having a plurality of pixels, the method comprising:
   (a) at each pixel of the plurality of pixels, determining a plurality of phase-correlation values associated with at least one exposure duration and at least one phase offset;
   (b) for said each pixel, accumulating by a computer processor the plurality of phase-correlation values to determine an accumulated correlation in response to the plurality of phase-correlation values, said accumulated correlation being of a plurality of accumulated correlations associated with the plurality of pixels; and
   (c) generating the depth map in response to the plurality of accumulated correlations associated with the plurality of pixels.

2. The method of claim 1 wherein step (a) comprises selecting one exposure duration of said at least one exposure duration, selecting one phase offset of said at least one phase offset, for said each pixel determining a reflected signal in response to reflected energy sensed by the time-of-flight image sensor, and for said each pixel determining one phase-correlation value of the plurality of phase-correlation values such that said one phase-correlation value represents a phase difference between a modulating signal associated with said one phase offset and the reflected signal during a time period associated with said one exposure duration.

3. The method of claim 1 wherein step (b) comprises determining the accumulated correlation as a sum of valid phase-correlation values of the plurality of phase-correlation values.

4. The method of claim 1 wherein step (b) comprises determining, for said each pixel, a plural set of accumulated correlations of the plurality of accumulated correlations in response to a plurality of sets of the plurality of phase-correlation values such that each said accumulated correlation is associated with one unique phase offset of the at least one phase offset in response to each set of the plurality of sets being associated with one exposure duration of said at least one exposure duration, said plural set being of a plurality of plural sets associated with the plurality of pixels, and wherein step (c) comprises generating the depth map in response to the plurality of plural sets.

5. A computer-implemented method of generating a depth map using a time-of-flight image sensor having a plurality of pixels, the method comprising:
(a) at each pixel of the plurality of pixels, determining a plurality of phase-correlation values associated with at least one exposure duration and at least one phase offset;
(b) for said each pixel, determining by a computer processor an accumulated correlation in response to the plurality of phase-correlation values, said accumulated correlation being of a plurality of accumulated correlations associated with the plurality of pixels; and
(c) generating the depth map in response to the plurality of accumulated correlations associated with the plurality of pixels,
wherein step (a) comprises weighting each phase-correlation value of the plurality of phase-correlation values according to a weighting function associated with said at least one exposure duration.

6. A computer-implemented method of generating a depth map using a time-of-flight image sensor having a plurality of pixels, the method comprising:
(a) at each pixel of the plurality of pixels, determining a plurality of phase-correlation values associated with at least one exposure duration and at least one phase offset, and determining, in response to the plurality of phase-correlation values, an invalid-pixel mask associated with the plurality of pixels;
(b) for said each pixel, determining by a computer processor an accumulated correlation in response to the plurality of phase-correlation values, said accumulated correlation being of a plurality of accumulated correlations associated with the plurality of pixels; and
(c) generating the depth map in response to the plurality of accumulated correlations associated with the plurality of pixels,
wherein step (c) comprises generating the depth map in response to the plurality of accumulated correlations and the invalid-pixel mask.

7. A computer-implemented method of generating a depth map using a time-of-flight image sensor having a plurality of pixels, the method comprising:
(a) at each pixel of the plurality of pixels, determining a plurality of phase-correlation values associated with at least one exposure duration and at least one phase offset;
(b) for said each pixel, determining by a computer processor an accumulated correlation in response to the plurality of phase-correlation values, said accumulated correlation being of a plurality of accumulated correlations associated with the plurality of pixels;
(c) generating the depth map in response to the plurality of accumulated correlations associated with the plurality of pixels; and
(d) determining, in response to the plurality of phase-correlation values and said at least one exposure duration, a normalization mask associated with the plurality of pixels.

8. The method of claim 7 further comprising:
(e) generating an amplitude image in response to the plurality of accumulated correlations and the normalization mask.

9. A computer-implemented method of generating a depth map using a time-of-flight image sensor having a plurality of pixels, the method comprising:
(a) at each pixel of the plurality of pixels, determining a plurality of phase-correlation values associated with at least one exposure duration and at least one phase offset;
(b) for said each pixel, determining by a computer processor an accumulated correlation in response to the plurality of phase-correlation values, said accumulated correlation being of a plurality of accumulated correlations associated with the plurality of pixels; and
(c) generating the depth map in response to the plurality of accumulated correlations associated with the plurality of pixels,
wherein step (b) comprises determining, for said each pixel, a plural set of accumulated correlations of the plurality of accumulated correlations in response to a plurality of sets of the plurality of phase-correlation values such that each said accumulated correlation is associated with one unique phase offset of the at least one phase offset in response to each set of the plurality of sets being associated with one exposure duration of said at least one exposure duration, said plural set being of a plurality of plural sets associated with the plurality of pixels, wherein step (c) comprises generating the depth map in response to the plurality of plural sets, and wherein step (b) comprises incrementing said each accumulated correlation by a corresponding phase-correlation value of the plurality of phase-correlation values if said corresponding phase-correlation value is a member of a valid set of the plurality of sets.

10. A computer-implemented method of generating a depth map using a time-of-flight image sensor having a plurality of pixels, the method comprising:
(a) at each pixel of the plurality of pixels, determining a plurality of phase-correlation values associated with at least one exposure duration and at least one phase offset;
(b) for said each pixel, determining by a computer processor an accumulated correlation in response to the plurality of phase-correlation values, said accumulated correlation being of a plurality of accumulated correlations associated with the plurality of pixels; and
(c) generating the depth map in response to the plurality of accumulated correlations associated with the plurality of pixels, wherein step (b) comprises determining, for said each pixel, a plural set of accumulated correlations of the plurality of accumulated correlations in response to a plurality of sets of the plurality of phase-correlation values such that each said accumulated correlation is associated with one unique phase offset of the at least one phase offset in response to each set of the plurality of sets being associated with one exposure duration of said at least one exposure duration, said plural set being of a plurality of plural sets associated with the plurality of pixels, wherein step (c) comprises generating the depth map in response to the plurality of plural sets, and wherein step (a) comprises weighting each phase-correlation value of the plurality of phase-correlation values according to a weighting function associated with said at least one exposure duration; and wherein step (b) comprises determining said plural set such that said each set is associated with one unique exposure duration of said at least one exposure duration.

11. A computer-implemented method of generating a depth map using a time-of-flight image sensor having a plurality of pixels, the method comprising:
(a) at each pixel of the plurality of pixels, determining a plurality of phase-correlation values associated with at least one exposure duration and at least one phase offset;
(b) for said each pixel, determining by a computer processor an accumulated correlation in response to the plurality of phase-correlation values, said accumulated correlation being of a plurality of accumulated correlations associated with the plurality of pixels; and
(c) generating the depth map in response to the plurality of accumulated correlations associated with the plurality of pixels,
wherein step (b) comprises determining, for said each pixel, a plural set of accumulated correlations of the plurality of accumulated correlations in response to a plurality of sets of the plurality of phase-correlation values such that each said accumulated correlation is associated with one unique phase offset of the at least one phase offset in response to each set of the plurality of sets being associated with one exposure duration of said at least one exposure duration, said plural set being of a plurality of plural sets associated with the plurality of pixels, wherein step (c) comprises generating the depth map in response to the plurality of plural sets, and wherein the method comprises determining, in response to the plurality of sets, an invalid-pixel mask indicating as invalid any pixel of the plurality of pixels for which each and every set of the plurality of sets associated with said any pixel contains one or more invalid phase-correlation values of the plurality of phase-correlation values.

12. The method of claim 11 wherein step (c) comprises generating the depth map in response to the plurality of plural sets and the invalid-pixel mask.

13. A computer-implemented method of generating a depth map using a time-of-flight image sensor having a plurality of pixels, the method comprising:
(a) at each pixel of the plurality of pixels, determining a plurality of phase-correlation values associated with at least one exposure duration and at least one phase offset;
(b) for said each pixel, determining by a computer processor an accumulated correlation in response to the plurality of phase-correlation values, said accumulated correlation being of a plurality of accumulated correlations associated with the plurality of pixels; and
(c) generating the depth map in response to the plurality of accumulated correlations associated with the plurality of pixels,
wherein step (b) comprises determining, for said each pixel, a plural set of accumulated correlations of the plurality of accumulated correlations in response to a plurality of sets of the plurality of phase-correlation values such that each said accumulated correlation is associated with one unique phase offset of the at least one phase offset in response to each set of the plurality of sets being associated with one exposure duration of said at least one exposure duration, said plural set being of a plurality of plural sets associated with the plurality of pixels, wherein step (c) comprises generating the depth map in response to the plurality of plural sets, and wherein the method comprises determining a normalization mask indicating for said each pixel a sum associated with all valid exposure durations of said at least one exposure duration such that said all valid exposure durations are associated with a valid set of the plurality of sets for which all phase-correlation values of said valid set are valid.

14. The method of claim 13 further comprising generating an amplitude image in response to the plurality of plural sets and the normalization mask.

15. A computer-implemented method of generating a depth map using a time-of-flight image sensor having a plurality of pixels, the method comprising:
(a) at each pixel of the plurality of pixels, determining a plurality of phase-correlation values associated with at least one exposure duration and at least one phase offset;
(b) for said each pixel, determining by a computer processor an accumulated correlation in response to the plurality of phase-correlation values, said accumulated correlation being of a plurality of accumulated correlations associated with the plurality of pixels; and
(c) generating the depth map in response to the plurality of accumulated correlations associated with the plurality of pixels,
wherein step (b) comprises determining, for said each pixel, a plural set of accumulated correlations of the plurality of accumulated correlations in response to a plurality of sets of the plurality of phase-correlation values such that each said accumulated correlation is associated with one unique phase offset of the at least one phase offset in response to each set of the plurality of sets being associated with one exposure duration of said at least one exposure duration, said plural set being of a plurality of plural sets associated with the plurality of pixels, wherein step (c) comprises generating the depth map in response to the plurality of plural sets, and wherein step (b) comprises, in response to an invalid set of the plurality of sets, linearly extrapolating said plural set on the basis of one or more valid sets of the plurality of sets.

16. A time-of-flight camera operable to generate a depth map, the camera comprising a time-of-flight image sensor having a plurality of pixels, the camera comprising a processor, the camera being configured to:
(a) determine, at each pixel of the plurality of pixels, a plurality of phase-correlation values associated with at least one exposure duration and at least one phase offset;

(b) determine by the processor, for said each pixel, an accumulated correlation in response to the plurality of phase-correlation values, said accumulated correlation being of a plurality of accumulated correlations associated with the plurality of pixels; and
(c) generate the depth map in response to the plurality of accumulated correlations associated with the plurality of pixels.

17. The camera of claim 16 wherein the processor is configured to determine, for said each pixel, a plural set of accumulated correlations of the plurality of accumulated correlations in response to a plurality of sets of the plurality of phase-correlation values such that each said accumulated correlation is associated with one unique phase offset of said at least one phase offset in response to each set of the plurality of sets being associated with one exposure duration of said at least one exposure duration, said plural set being of a plurality of plural sets associated with the plurality of pixels, and configured to generate the depth map in response to the plurality of plural sets.

18. A time-of-flight camera operable to generate a depth map, the camera comprising a time-of-flight image sensor having a plurality of pixels, the camera comprising a processor, the camera being configured to:
(a) determine, at each pixel of the plurality of pixels, a plurality of phase-correlation values associated with at least one exposure duration and at least one phase offset;
(b) determine by the processor, for said each pixel, an accumulated correlation in response to the plurality of phase-correlation values, said accumulated correlation being of a plurality of accumulated correlations associated with the plurality of pixels; and
(c) generate the depth map in response to the plurality of accumulated correlations associated with the plurality of pixels,
wherein the processor is configured to determine, for said each pixel, a plural set of accumulated correlations of the plurality of accumulated correlations in response to a plurality of sets of the plurality of phase-correlation values such that each said accumulated correlation is associated with one unique phase offset of said at least one phase offset in response to each set of the plurality of sets being associated with one exposure duration of said at least one exposure duration, said plural set being of a plurality of plural sets associated with the plurality of pixels, wherein the processor is configured to generate the depth map in response to the plurality of plural sets, and wherein the processor is configured to increment each said accumulated correlation by a corresponding phase-correlation value of the plurality of phase-correlation values if said corresponding phase-correlation value is a member of a valid set of the plurality of sets.

19. A time-of-flight camera comprising:
(a) means for determining a plurality of phase-correlation values;
(b) means for determining an accumulated correlation in response to the plurality of phase-correlation values, said accumulated correlation being of a plurality of accumulated correlations; and
(c) means for generating a depth map in response to the plurality of accumulated correlations.

20. The camera of claim 19 further comprising means for generating an amplitude image in response to the plurality of accumulated correlations.

21. A time-of-flight camera comprising:
(a) means for determining a plurality of phase-correlation values;
(b) means for determining an accumulated correlation in response to the plurality of phase-correlation values, said accumulated correlation being of a plurality of accumulated correlations; and
(c) means for generating a depth map in response to the plurality of accumulated correlations,
wherein the means for determining the accumulated correlation in response to the plurality of phase-correlation values comprises means for incrementing the accumulated correlation.

* * * * *